PRESET ELECTRICAL CONTROL INSTRUMENTALITY WITH PLUG-IN SHAFT

Filed Jan. 8, 1953

3 Sheets-Sheet 1

Inventors
Arthur M. Daily
Mervin B. Ansman
Donald A. Pierce
By [signature]
Attorney Feb. 16, 1954 A. M. DAILY ET AL 2,669,634

PRESET ELECTRICAL CONTROL INSTRUMENTALITY WITH PLUG-IN SHAFT

Filed Jan. 8, 1953 3 Sheets-Sheet 2

Inventors
Arthur M. Daily
Mervin B. Arisman
Donald A. Pierce
By [signature]
Attorney Inventors
Arthur M. Daily
Mervin B. Arisman
Donald A. Pierce
By [signature]
Attorney Patented Feb. 16, 1954 2,669,634

UNITED STATES PATENT OFFICE 2,669,634

PRESET ELECTRICAL CONTROL INSTRUMENTALITY WITH PLUG-IN SHAFT

Arthur M. Daily and Mervin B. Arisman, Elkhart, and Donald A. Pierce, South Bend, Ind., assignors to Chicago Telephone Supply Corporation, Elkhart, Ind., a corporation of Indiana Application January 8, 1953, Serial No. 330,304

12 Claims. (Cl. 201—55)

This invention relates to electrical control instrumentalities and refers more particularly to variable resistance control units of the so-called preset type.

Such preset variable resistance controls are used extensively on television receivers to effect the critical adjustments of the various circuits which control the quality of the picture. As these adjustments are generally made by a skilled technician before the television set leaves the factory, and whenever necessary by the set owner or repairmen servicing the receiver, the controls are used relatively infrequently, and for this reason they are usually mounted in a more or less inaccessible location on the receiver.

In general, therefore, preset variable resistance controls of the type described are usually mounted on an inside wall of a television receiver chassis either at its back or at its front, in which latter case a hinged door or the like normally conceals the control unit but provides access to its shaft for adjustment of the control.

The locations of these preset controls, of course, determine the length of the operating shaft needed therefor, and often identical chassis for receivers of the same model will require operating shafts of different lengths for a given preset control, such as when the chassis are mounted in different cabinets. On the other hand, different chassis often entail the use of operating shafts of different lengths even though preset controls of the same resistance value are used.

In view of the above, it has been necessary heretofore to design and manufacture variable resistance controls of the preset type to meet the installation requirements of the television receiver manufacturer. This put the manufacturer of preset controls at a disadvantage for he could never anticipate the installation requirements of the television receiver manufacturer and accordingly, his production had to be geared to the programs of the various manufacturers of television receivers. Stock piling of preset controls having standard resistance values, during off peak seasons, was impossible.

The conditions outlined have also been extremely annoying to the manufacturers of television receivers for the reason that unless relatively close tolerances were held to in the mounting of the receiver chassis in their cabinets, the operating shafts of the preset controls were very apt to be too long or too short.

This invention overcomes all of these disadvantages through the substitution of a novel plug-in form of shaft for that customarily used in variable resistance controls.

Plug-in shafts per se are not new and have been used for the operation of variable resistance controls as disclosed in Patent No. 2,257,979, issued October 7, 1941. Heretofore, however, this concept of providing a plug-in shaft for operating a variable resistance control has never been applied to controls of the preset type such as are used in television receivers, no doubt because the controls to which these earlier shafts were applied and the manner in which the shafts were connected to the rotatable element of the control were not adapted for this specialized service.

It is therefore an object of this invention to provide a variable resistance control unit especially designed for preset service and adapted for actuation either by a readily removable plug-in shaft of any practicable length or by such conventional means as a screw driver or other similar tool.

In this connection it is another object of this invention to provide a variable resistance control unit of the preset type used in television receivers which may be adjusted by the same means, namely a plug-in shaft or a screw driver, inserted either from the front or from the back of the control. This feature is especially important since it gives the variable resistance control unit of this invention a flexibility or universality of mounting not possessed by control units not so selectively adjustable.

A further object of this invention resides in the provision of a variable resistance control device of the preset type which may be actuated by a tool applied thereto from the exterior of the housing either at its front or at its rear, and which incorporates a rotatable contact assembly supported for rotation in the housing of the unit in a unique manner obviating the need for the conventional bushing while at the same time assuring unusually secure support for the contact assembly both against side thrust and end thrust in one direction.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which.

Referring now particularly to the accompanying drawings, the numeral 5 generally designates the housing of a variable resistance control device of the preset type such as are used in television receivers. The main portion of the housing comprises a cup-shaped sheet metal stamping, having a bottom wall 6 which provides the rear wall of the housing, and a cylindrical wall 7 projecting forwardly therefrom provides the side wall of the housing. The front of the housing is closed by a disc 8 of insulating material seated flatwise against the rim of the side wall 7, and this disc comprises the front wall of the housing.

Figure 3:
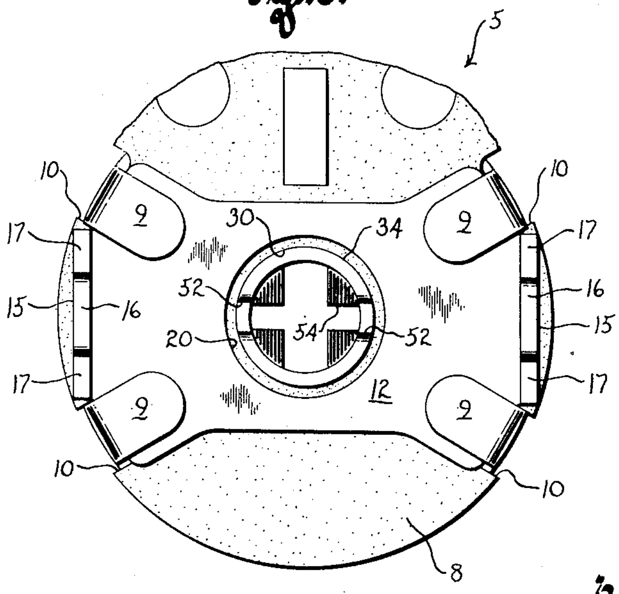
Figure 3 is a front elevational view of the control instrumentality, portions thereof being broken away.

As is customary, the insulating disc 8 is attached to the housing as by attaching tabs 9 on the side wall of the housing projecting forwardly from its rim through peripheral notches 10 in the disc to be bent inwardly over the front of the disc. As shown best in Figure 3, in the present case the tabs 9 serve to hold a grounding plate 12 on the front of the housing in a position clamped flatwise against the front face of the insulating disc 8.

The variable resistance control unit herein shown is adapted to be mounted on the inner side of one of the chassis walls 13 of a television receiver with the front wall of the housing adjacent thereto. The grounding plate 12 provides the mounting means, and not only grounds the cup-shaped main portion of the housing to the chassis wall but also serves to hold the current carrying portions exposed on the front of the housing from coming in contact with the wall 13 of the chassis. For this purpose, the grounding plate is provided with a pair of opposite legs 15 projecting forwardly from diametrically opposite portions of the periphery of the plate, the legs terminating in reduced fastening tabs 16 flanked by forwardly facing shoulders 17. These shoulders are adapted to engage the inner face of the chassis wall upon which the control device is to be mounted to hold the device in spaced relationship thereto.

Figure 1:
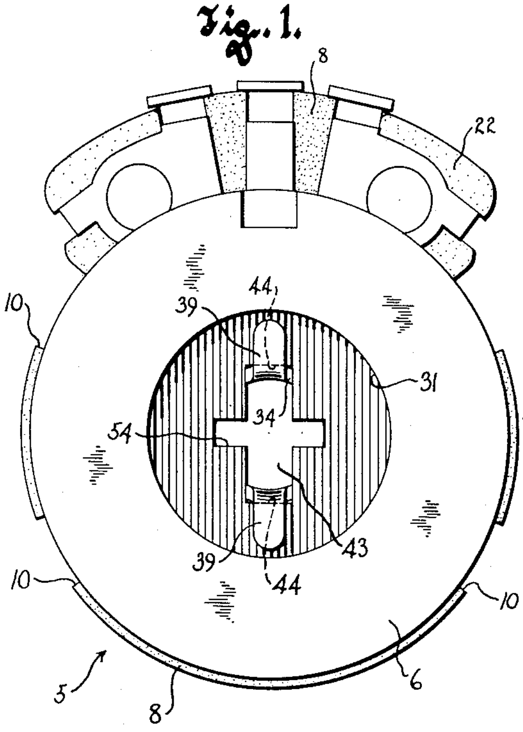
Figure 1 is an elevational view of an electrical control instrumentality embodying this invention, looking at the rear thereof.
Figure 2:
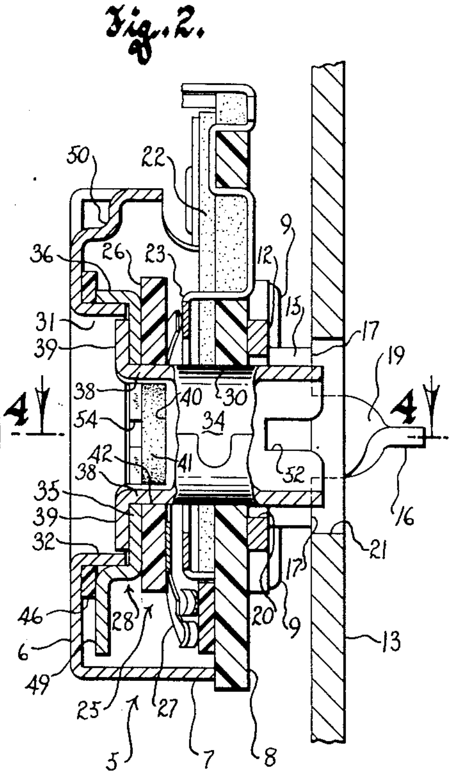
Figure 2 is a longitudinal sectional view through the control instrumentality shown in Figure 1.

The fastening tabs 16, of course, are adapted to be projected through suitable slits, not shown, in the chassis wall and when twisted as indicated at 19 in Figure 2 serve to securely mount the variable resistance control on the chassis.

For a purpose to be later described, the attaching tabs 9 hold the grounding plate in position on the front of the control unit with a hole 20 in the central portion of the grounding plate substantially coaxial with the cup-shaped main portion of the housing 5 and with an access hole 21 in the wall 13 of the chassis.

As is usual in most variable resistance control devices, the unit is provided with an arcuate resistance strip 22 fixed to the front wall 8 and overlying the inner face thereof, and a collector ring 23 also carried by the front wall 8 of the housing but having portions spaced slightly rearwardly of the exposed face of the resistance strip.

The control device further includes a rotatable contact assembly indicated generally by the numeral 25 comprising a contact carrier 26 in the form of a flat disc of insulating material having resilient contact fingers 27 on its front face cooperable with the resistance strip and the collector ring in a conventional manner. A driver 28 also forms a part of the contact assembly and in the present case the driver is of novel construction to be more specifically described later.

The contact assembly is supported in the housing for rotation on the axis of the cup-shaped portion thereof by bearings provided on both the front and rear walls of the housing. A hole 30 in the center of the front wall, coaxial with but smaller than the hole 20 in the grounding plate 12, provides one of these bearings. The rear wall 6 of the housing has a relatively large hole 31 therein coaxial with the hole 30, and the portions of the rear wall adjacent to the edges of its hole are directed inwardly to provide a cylindrical flange 32 which constitutes the other bearing for the contact assembly.

These bearings, although extremely simple and inexpensive to produce, serve to rotatably support the contact assembly in an exceptionally secure manner against any side thrust thereon, and obviate the need for the bushing usually fixed to the front wall of conventional control devices of this nature.

The driver 28 comprises a tubular hub 34 rolled up from a flat stamped piece of sheet metal, and a stamped relatively flat body portion 35 fixed to the rear end portion of the hub. The body portion 35 overlies and flatwise engages the rear face of the contact carrier 26, and it is rotatably supported by the rear wall of the housing by a series of circumferentially spaced flanges 36 bent rearwardly from its periphery and rotatively embracing the flange 32 on the rear wall of the housing. The hub 34 of the driver projects forwardly from the body portion 35 through the hole 30 in the front wall of the housing so as to be journalled in the bearing provided thereby, and while functionally the hub may be considered as an operating shaft for the unit, it projects only a slight distance forwardly beyond the front wall of the housing as seen in Figure 2.

The body portion 35 of the driver and the contact carrier 26 are fixed to the rear end portion of the hub 34 by a pair of tongues 38 on the hub extending rearwardly from diametrically opposite portions of its side wall and projecting through the contact carrier and the body portion of the hub to have their extremities bent outwardly over the rear face of the body portion as at 39. The outwardly bent portions 39 of the tongues thus hold the body portion of the driver and the contact carrier firmly clamped together with the front face of the contact carrier pressed against shoulders 40 on the front portion of the hub between the tongues 38.

In order to enable securement of the parts of the contact assembly together in this manner it will be noted that the contact carrier 26 has a central aperture 41 therein of a diameter substantially equal to the inside diameter of the hub, while the tongues 38 on the hub are received in diametrically opposite notches 42 in the edges of the aperture 41, so that the contact carrier is in effect keyed to the hub. The body portion of the driver is also keyed to the hub and for this purpose has a cruciform opening 43 in its central portion, the extremities of its vertical branch providing notches 44 through which the tongues 38 project.

Figures 4, 5, 6, 7:
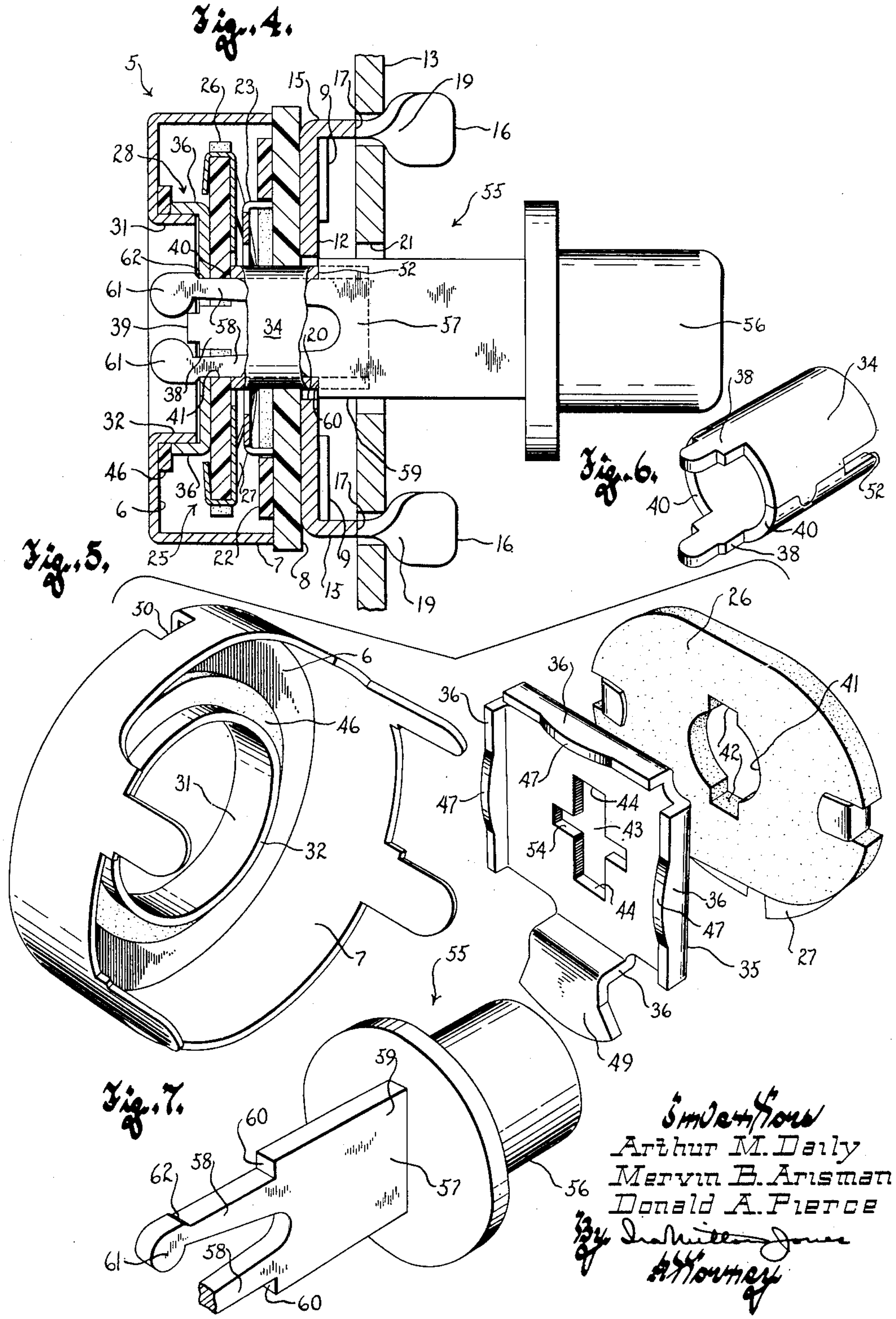
Figure 4 is a longitudinal sectional view taken through Figure 2 along the plane of the line 4—4, showing the plug-in shaft inserted into the unit.
Figure 5 is an exploded perspective view showing the rear portion of the housing of the unit and elements of the contact assembly.
Figure 6 is a perspective view of the hub of the contact assembly.
Figure 7 is a perspective view of the plug-in operating shaft of this invention.

The contact assembly is also supported against rearward end thrust, such as is imposed thereon by the engagement of the resilient contact fingers 27 with the collector ring and resistance strip, either by direct engagement of the rear extremities of the flanges 36 with the rear wall of the housing or by engagement of these flanges with a washer 46 of insulating material or other suitable antifriction material interposed between the ends of the flanges and the rear wall of the housing as seen in Figure 2. To reduce friction to a minimum the rear extremities of the flanges 36 on the driver are rounded slightly as seen at 47 in Figure 5.

One of the flanges 36 on the driver is longer than the remaining flanges and has its forward end portion bent radially outwardly to provide an arm 49 cooperable with an indentation 50 in the rear wall of the housing at its junction with the cylindrical side wall thereof to provide rotation stops for the contact assembly.

The cruciform opening 43 in the rear portion of the driver is readily accessible from the rear of the housing to a tool such as a screw driver which may be inserted into either branch of the opening to impart rotation to the contact assembly from inside the chassis of the television receiver. According to this invention, however, the projecting front extremity of the hub 34 of the driver has forwardly opening diametrically opposite notches 52 therein which provide a drive slot accessible from the front of the housing to a tool such as a screw driver or the like inserted through the aperture 21 in the chassis wall upon which the control device is mounted to enable the contact assembly to be rotated manually.

It is particularly important to note that the drive slot provided by the notches 52 in the front of the hub is angularly aligned with the lateral branch 54 of the cruciform opening at the rear end portion of the driver hub, and that the hub is hollow. This enables a readily detachable plug-in type operating shaft, generally designated 55, to be inserted into either end of the hub and drivingly connected therewith to enable rotation to be more readily imparted to the contact assembly from either the front or back of the housing of the resistance control device. This plug-in type operating shaft is shown best in Figures 4 and 7 and comprises a relatively flat sheet metal stamping having a knob 56 joined to one end thereof, and having a stem portion 57, projecting from the knob, which is longitudinally slit to provide opposite bifurcations 58. These bifurcations constitute spring tines, in that they yieldingly resist any force tending to draw them edgewise together, and they are so spaced apart as to fit the internal diameter of the hub 34 of the driver. At the bases of the bifurcations, near the knob 56, the stem of the operating shaft is enlarged in the plane of the stem to provide a driving portion 59 on the operating shaft which is adapted to be received in the drive slot provided by the notches 52 in the rear of the hub. The driving portion 59, of course, has opposite rearwardly facing shoulders 60 thereon which engage the bottoms of the notches 52 in the hub to limit the extent to which the bifurcated end of the operating shaft may be inserted into the hub.

At their outer extremities, each of the bifurcations is provided with an enlargement 61. These enlargements are more or less rounded and extend a substantial distance toward one another so as to limit flexure of the bifurcations together an extent which might permanently deform them. The outer convex edges of the enlargements lie in planes spaced outwardly of the adjacent side edges of the bifurcations, and at their junctions with the bifurcations define forwardly facing shoulders 62. These shoulders are slightly beveled, that is they converge inwardly toward the knob end of the operating shaft, so as to define cam surfaces. In addition, the shoulders are so located with respect to the rearwardly facing shoulders 60 on the shaft that they will engage with edge portions of the lateral branch of the cruciform opening 43, at the rear of the driver, when the abutments 60 on the shaft are bottomed in the notches 52 of the hub so as to securely hold the operating shaft drivingly connected with the driver, while at the same time permitting detachment of the shaft by pulling the same from the front of the housing.

From this it will be seen that the enlargements 61 on the outer end of the operating shaft are in the nature of hook-like portions which are sprung outwardly beyond the extremities of the transverse branch 54 of the cruciform opening when the operating shaft is inserted into the driver hub from the front of the housing to hold the shaft against accidental detachment.

It is to be understood that the plug-in operating shaft described is not intended for such variable resistance controls as are used continuously as for the control of volume, but only for such controls as are used infrequently and may be mounted in a normally inaccessible location either on the back of the chassis or where they are normally concealed by a hinged cover or the like.

A feature of this invention is that the plug-in type operating shaft herein disclosed may be inserted into the driver hub from either the front or the back of the housing, and that it will automatically lock itself in place against accidental displacement regardless of whether it is inserted from the front or the back. This feature results from the fact that the driving slot provided by the notches 52 in the front extremity of the driver is of the same size and length as the slot provided by the transverse branch 54 of the cruciform opening in the body of the driver, and of course, the bottoms of the notches 52 are always spaced the same distance from the rear face of the body portion of the driver.

One of the important advantages achieved through the use of a plug-in type shaft of the character described is that while the length of its bifurcations 58 may be standardized, the axial length of the driving portion 59 of the shaft may be of any desired dimension thereby enabling the manufacture of such plug-in type shafts with driving portions of a variety of different lengths. This permits the proper length shaft to be selected by the manufacturer of television receivers after installation of their chassis in the cabinets provided therefor, and eliminates the need for critical and accurate location of the chassis in its cabinet. In other words, if the workman installing a chassis in its cabinet finds that one operating shaft of the plug-in type is too long or too short, he can easily select a similar shaft of the required length at the time of installation.

Figure 8:
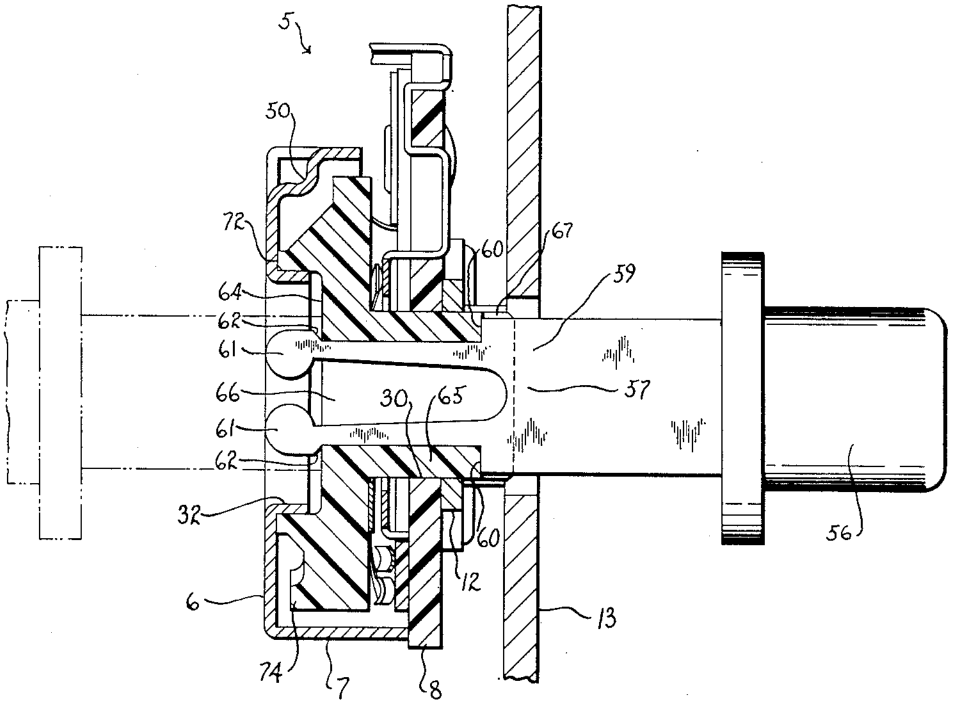
Figure 8 is a longitudinal sectional view similar to Figure 4 but illustrating a modified form of the invention.
Figure 9:
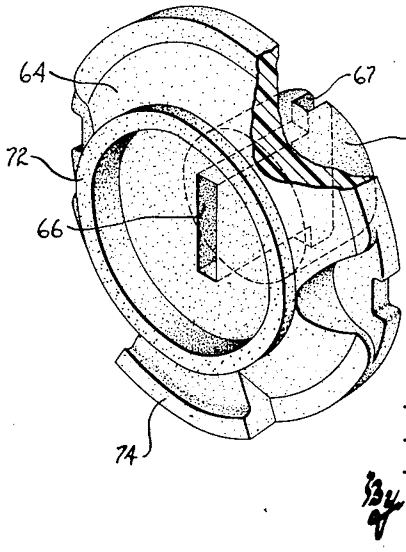
Figure 9 is a perspective view of the driver employed in the unit shown in Figure 8 with portions of the driver broken away and shown in section.

In the modified embodiment of the invention shown in Figures 8 and 9 of the drawings all of the advantages as to the use of a plug-in type operating shaft and actuation of the contact assembly by a screw driver or the like from either the front or the back of the housing are achieved using a molded driver 64. As will be apparent from Figure 8, the molded driver has a hollow hub 65, but in this case the central opening in the hub is not round as it was with the stamped and rolled-up hub of the previous embodiment of the invention but is in the nature of a narrow slot 66 extending all the way through the hub from one end of the driver to the other.

This slot, of course, corresponds in shape and size to the transverse branch 54 of the cruciform opening of the stamped driver, and at its front end the hub is provided with diametrically opposite notches 67 similar to the notches 52 previously described.

The body portion of the driver also has a forwardly projecting annular flange 72 thereon which rotatively embraces the flange 32 on the front wall of the housing to rotatably support the contact assembly at the rear thereof; while the hub of the driver is again rotatably supported in the hole 30 in the front wall of the housing to thus support the front portions of the contact assembly.

The flange 72 on the rear of the driver in this case is shown with its rim directly engaged with the rear wall of the housing to support the contact assembly against rearward end thrust thereon and to hold the contact fingers engaged with the resistance strip and collector ring with the proper degree of tension. A lug 74 integrally molded with the driver in this case provides an arm which is engageable with the indentation 50 on the housing to limit rotation of the contact assembly in the housing.

From the foregoing description taken together with the accompanying drawings it will be readily apparent to those skilled in the art that this invention provides an unusually simple electrical resistance control unit of the preset type which is adapted for operation either by a tool applied thereto from the front or the back of the housing of the unit, or by a plug-in type operating shaft insertable either into the front or the back of the unit; and that simple yet sturdy means is provided for supporting the contact assembly for rotation both at the front and the rear of the housing with further stability of the contact assembly assured by the fact that it receives support against rearward end thrust from the rear wall of the housing.

What we claim as our invention is:

1. In an electrical control instrumentality of the character described: a housing having opposing front and rear walls in fixed spaced apart relationship, said walls having coaxial holes therein; a rotatable contact assembly in the housing intermediate its front and rear walls, said contact assembly including a contact carrier adjacent to the front wall of the housing, a driver for said carrier having a hollow hub journalled in said hole in the front wall of the housing to mount the contact assembly for rotation in the housing about an axis which coincides with that of said holes; and means on said driver, engageable by a tool applied thereto from the exterior of the housing either at its front or at its rear, providing for manual rotation of the contact assembly in the housing.

2. The electrical control instrumentality set forth in claim 1 wherein said hollow hub projects forwardly slightly beyond the front wall of the housing and has a drive slot in its front extremity to enable rotation to be imparted to the contact assembly by a tool applied to the drive slot from the front of the housing; and further characterized by the provision of means on the driver adjacent to the rear wall of the housing, and aligning with the hole therein, providing a drive slot to enable rotation to be imparted to the contact assembly by a tool from the rear of the housing.

3. In an electrical control instrumentality of the character described: a housing having opposing front and rear walls in fixed spaced apart relationship, the front wall having a central aperture therein; a rotatable contact assembly in the housing intermediate its front and rear walls, said contact assembly including a contact carrier facing the front wall of the housing, a driver for said carrier having a portion overlying the rear of the carrier, and a hollow hub on the driver extending forwardly therefrom past the contact carrier and journalled in said aperture in the front wall of the housing to thereby rotatably mount the contact assembly for rotation in the housing; cooperating means on the driver and on the rear wall of the housing for holding the contact assembly against rearward motion in the housing; and means on said driver, engageable by a tool applied thereto from the front of the housing, providing for manual rotation of the contact assembly by said tool.

4. The electrical control instrumentality set forth in claim 3 further characterized by the provision of flange means on the rear wall of the housing providing a bearing coaxial with said aperture in the front wall of the housing; and wherein the driver is rotatably supported in the housing jointly by said flange means and by the reception of the front portion of its hub in the aperture in the front wall of the housing.

5. The electrical control instrumentality set forth in claim 4 further characterized by the fact that the rear wall of the housing has an opening therein aligning with the aperture in the front wall of the housing, and wherein the flange means on the rear wall of the housing extends forwardly from portions of the rear wall adjacent to the edge of the opening therein and has a portion of the driver rotarily seated thereon, said opening providing for the transmission of rotation to the driver from the rear of the housing by a tool inserted through said opening.

6. The electrical control instrumentality set forth in claim 5 further characterized by the provision of cooperating means on the driver and the rear wall of the housing precluding rearward motion of the contact assembly in the housing.

7. In an electrical control instrumentality of the character described: a housing having opposing front and rear walls in fixed spaced apart relationship, the front wall having a substantially central hole therein providing a bearing; a contact assembly in the housing rotatably supported by said bearing and comprising a rotatable contact carrier facing said front wall and having resilient contact means thereon reacting against said front wall to impose a rearward thrust upon the contact assembly, said contact assembly including a driver for the contact carrier having a portion facing the rear wall of the housing and bearing thereagainst so that the rear wall of the housing supports the contact assembly against the rearward thrust imposed thereon by said resilient contact means; and a hollow hub on the driver extending forwardly into said hole in the front wall of the housing to rotatably mount the contact assembly thereon, the front end portion of the hub projecting slightly beyond said front wall to the exterior of the housing and having means thereon providing a drive slot to enable rotation to be imparted to the contact assembly through the driver by a tool applied to said drive slot from the front of the housing.

8. In an electrical control instrumentality of the character described: a housing having opposing front and rear walls in fixed spaced apart relationship, the front wall having a substantially central hole therein providing a bearing; a contact assembly in the housing rotatably supported by said bearing and comprising a contact carrier facing said front wall and having resilient contact means thereon which react against said front wall to impose a rearward thrust upon the contact assembly, said contact assembly including a driver having a portion overlying the rear of the carrier and bearing against the rear wall of the housing so that the contact assembly is supported thereby against said rearward thrust, said driver having an opening in its central portion; a hollow hub on the driver extending forwardly therefrom, in alignment with said opening, and received in the bearing provided by said hole in the front wall of the housing to rotatably mount the contact assembly thereon, said hub projecting forwardly through said hole to have a relatively short length thereof exposed at the front of the housing, and said projecting end of the hub having means thereon defining a forwardly opening drive slot enabling rotation to be imparted to the contact assembly through the driver by a tool applied to said drive slot from the front of the housing; and an operating shaft for the contact assembly comprising a driving portion drivingly engaged in said drive slot of the hub, substantially resilient bifurcations extending rearwardly from the driving portion through said hollow hub and the opening in the central portion of the driver, and enlargements on the extremities of said bifurcations having forwardly facing cam-like shoulders engaged over portions at the rear of the driver adjacent to the edges of the opening therein to hold the shaft drivingly connected with the hub while allowing detachment of the shaft in consequence of the application of forward force to the shaft great enough to cause the bifurcations to be cammed together a distance sufficient to allow the enlargements on their ends to pass forwardly through the hollow hub.

9. In an electrical control instrumentality of the character described: a housing having front and rear walls in fixed spaced apart relationship, said walls having aligning holes in their central portions; a contact assembly in the housing rotatably supported thereby for rotation about an axis substantially coinciding with the axis of said aligning holes, said contact assembly including a hollow hub coaxial with said holes; and means on the hub adjacent to each end thereof providing angularly aligned similar drive slots accessible from the exterior of the housing at both the front and the rear thereof, said drive slots enabling the contact assembly to be rotated from the exterior of the housing by a tool applied to either of said drive slots.

10. The electrical control instrumentality set forth in claim 9 further characterized by the provision of a plug-in type operating shaft for the contact assembly, said shaft having an outer driving portion drivingly engaged in the drive slot adjacent to one end of the hub, and a bifurcated stem portion, projecting from said driving portion and passing through the hollow hub and the drive slot adjacent to the other end thereof; and means on the extremities of said bifurcations providing cam-like shoulders engaged over edges of the drive slot adjacent to said other end of the hub to detachably hold the operating shaft drivingly connected with the hub.

11. In an electrical control instrumentality of the character described: a housing having front and rear walls in fixed spaced apart relationship, said walls having aligning holes in their central portions; a contact assembly in the housing supported jointly by its front and rear walls for rotation about an axis coinciding with that of said holes, said contact assembly including a hollow hub coaxial with said holes; and means fixed with respect to said hub providing a pair of similar axially spaced angularly aligned drive slots both of which are accessible from either the front or the rear of the housing through the hub, said drive slots enabling the contact assembly to be rotated by a tool applied to either or both of said slots from either the front or the back of the housing.

12. In an electrical control instrumentality of the character described: a housing having front and rear walls in fixed spaced apart relationship, said walls having aligning holes in their central portions; a contact assembly in the housing rotatably supported thereby for rotation about an axis substantially coinciding with the axis of said aligning holes, said contact assembly including a driver having a hub coaxial with said holes and a relatively flat body joined to the hub and having a wall portion extending across one end thereof, said wall portion of the body having a drive slot therein; means on the other end of the hub providing another drive slot aligning angularly with the first designated drive slot; said slots being accessible at the exterior of the housing from both the front and rear thereof; a plug-in type operating shaft for the contact assembly, said shaft having an outer driving portion drivingly engaged in the drive slot in the hub and a bifurcated stem portion projecting through the hub and into the drive slot in said wall portion of the body of the driver; and means on the extremities of said bifurcations providing cam-like shoulders engaged over edge portions of the slot in said wall portion of the driver to detachably hold the operating shaft drivingly connected to the contact assembly.

ARTHUR M. DAILY.
MERVIN B. ARISMAN.
DONALD A. PIERCE.

No references cited.